(12) United States Patent
Brukilacchio

(10) Patent No.: US 10,409,045 B2
(45) Date of Patent: Sep. 10, 2019

(54) HOLLOW LIGHT INTEGRATOR FOR LIGHT EMITTING DIODE DIGITAL MICROMIRROR DEVICE ILLUMINATOR

(71) Applicant: Innovations in Optics, Inc., Woburn, MA (US)

(72) Inventor: Thomas John Brukilacchio, Reading, MA (US)

(73) Assignee: INNOVATIONS IN OPTICS, INC., Woburn, MA (US)

(*) Notice: Subject to any disclaimer, the term of this patent is extended or adjusted under 35 U.S.C. 154(b) by 0 days.

(21) Appl. No.: 15/954,916

(22) Filed: Apr. 17, 2018

(65) Prior Publication Data

US 2018/0239120 A1   Aug. 23, 2018

Related U.S. Application Data

(60) Division of application No. 15/410,108, filed on Jan. 19, 2017, now Pat. No. 9,971,135, which is a
(Continued)

(51) Int. Cl.
*G02B 17/08* (2006.01)
*G02B 26/08* (2006.01)
(Continued)

(52) U.S. Cl.
CPC ...... *G02B 17/0892* (2013.01); *B29C 35/0805* (2013.01); *B33Y 30/00* (2014.12);
(Continued)

(58) Field of Classification Search
CPC .............. G02B 17/0892; G02B 5/005; G02B 17/0868; G02B 19/0014; G02B 19/0028;
(Continued)

(56) References Cited

U.S. PATENT DOCUMENTS 5,442,414 A   8/1995   Janssen et al.
5,829,858 A   11/1998   Levis et al.
(Continued)

FOREIGN PATENT DOCUMENTS

WO   2007092073 A2   8/2007
WO   2004097516 A2   11/2007
(Continued)

OTHER PUBLICATIONS

International Search Report & Written Opinion in international patent application No. PCT/US15/29392, dated Aug. 25, 2015; 11 pages.
(Continued)

*Primary Examiner* — Nicole M Ippolito
(74) *Attorney, Agent, or Firm* — Schmeiser, Olsen & Watts LLP; William G. Guerin

(57) ABSTRACT

Described are optical systems for a digital micromirror device (DMD) illuminator. The optical systems include a LED array, a tapered non-imaging collection optic, a reflective stop and a telecentric lens system. The telecentric lens system is disposed along an optical axis defined between the tapered non-imaging collection optic and the reflective stop. The telecentric lens system is configured as a first half of a symmetric one to one imager for an object plane on the optical axis and as a second half of the symmetric one to one imager for optical energy reflected from the reflective aperture stop. The optical systems reclaim optical energy emitted by the LED array that does not initially pass through the reflective stop and provide an improved intensity distribution at the DMD. Reductions in stray light and the thermal loads on the illuminator and DMD are achieved relative to conventional illumination systems for DMDs.

9 Claims, 11 Drawing Sheets

Related U.S. Application Data continuation-in-part of application No. 14/705,202, filed on May 6, 2015, now abandoned.

(60) Provisional application No. 61/991,488, filed on May 10, 2014.

(51) Int. Cl.
| | |
|---|---|
| *G02B 19/00* | (2006.01) |
| *B33Y 30/00* | (2015.01) |
| *G02B 5/00* | (2006.01) |
| *B29C 35/08* | (2006.01) |
| *G02B 13/22* | (2006.01) |

(52) U.S. Cl.
CPC ......... *G02B 5/005* (2013.01); *G02B 17/0868* (2013.01); *G02B 19/0014* (2013.01); *G02B 19/0028* (2013.01); *G02B 19/0066* (2013.01); *G02B 19/0095* (2013.01); *G02B 26/0833* (2013.01); *B29C 2035/0827* (2013.01); *G02B 13/22* (2013.01)

(58) Field of Classification Search
CPC ............ G02B 19/0066; G02B 19/0095; G02B 26/0833; G02B 13/22; B33Y 30/00; B29C 35/0805; B29C 2035/0827
USPC ......... 250/492.1, 492.2, 493.1, 494.1, 504 R
See application file for complete search history.

(56) References Cited

U.S. PATENT DOCUMENTS

| | | | |
|---|---|---|---|
| 7,029,130 | B2 | 4/2006 | Cannon et al. |
| 2002/0167652 | A1 | 11/2002 | Ueyama |
| 2003/0031029 | A1* | 2/2003 | Kawaai .................. G02B 27/09 362/551 |
| 2006/0139580 | A1 | 6/2006 | Conner |
| 2007/0206390 | A1 | 9/2007 | Brukilacchio et al. |
| 2007/0263298 | A1 | 11/2007 | El-Ghoroury et al. |
| 2007/0291491 | A1 | 12/2007 | Li et al. |
| 2008/0018999 | A1 | 1/2008 | Schunk et al. |
| 2009/0190101 | A1 | 7/2009 | Alasaarela et al. |
| 2011/0037953 | A1 | 1/2011 | Nizani et al. |
| 2011/0075105 | A1 | 3/2011 | Ouyang et al. |
| 2012/0099308 | A1 | 4/2012 | Brukilacchio |
| 2012/0140186 | A1 | 6/2012 | Kuwata |
| 2012/0188786 | A1* | 7/2012 | Burges ............... G01N 21/8806 362/551 |

FOREIGN PATENT DOCUMENTS

| | | |
|---|---|---|
| WO | 2008011480 A2 | 1/2008 |
| WO | 2010084666 A1 | 7/2010 |
| WO | 2012057819 A2 | 5/2012 |

OTHER PUBLICATIONS

International Preliminary Report on Patentability in International Patent Application No. PCT/US15/29392, dated Nov. 24, 2016; 10 pages.
Non-Final Office Action in related U.S. Appl. No. 14/705,202, dated Feb. 23, 2017; 19 pages.
Invitation to Pay Additional Fees in PCT Application No. PCT/USI7/14084, dated Mar. 15, 2017; 2 pages.
Notice of Allowance in U.S. Appl. No. 14/705,202, dated Aug. 2, 2017; 7 pages.
International Search Report and Written Opinion in International Patent Application No. PCT/US17/14084, dated May 24, 2017; 11 pages.
Non-Final Office Action in U.S. Appl. No. 14/705,202, dated Nov. 27, 2017; 29 pages.
Non-Final Office Action in U.S. Appl. No. 15/410,108, dated Nov. 21, 2017; 17 pages.
Extended Search Report in European Patent Application No. 15792480.4, dated Dec. 6, 2017; 11 pages.
Notice of Allowance for U.S. Appl. No. 15/410,108, dated Mar. 22, 2018; 7 pages.
Final Office Action in U.S. Appl. No. 14/705,202, dated Jun. 13, 2018; 12 pages.
"DLP(TM) System Optics: Application Report," Texas Instruments Incorporated, Jul. 2010, www.TI.com; 26 pages.
Partial Search Report in European patent application No. 18178483.6 dated Dec. 6, 2018; 22 pages.
Extended Search Report in European patent application No. 18178483.6 dated Mar. 15, 2019; 19 pages.

* cited by examiner

HOLLOW LIGHT INTEGRATOR FOR LIGHT EMITTING DIODE DIGITAL MICROMIRROR DEVICE ILLUMINATOR

RELATED APPLICATIONS

This application is a divisional application of U.S. patent application Ser. No. 15/410,108, filed Jan. 19, 2017 and titled "Light Emitting Diode Digital Micromirror Device Illuminator," which is a continuation-in-part application of U.S. patent application Ser. No. 14/705,202, filed May 6, 2015 and titled "Light Emitting Diode Digital Micromirror Device Illuminator," which claims the benefit of and priority to U.S. Provisional Patent Application No. 61/991,488, filed May 10, 2014 and titled "High Radiance Ultraviolet Light Emitting Diode Digital Micromirror Device Illuminator." The contents of these applications are expressly incorporated herein by reference in their entireties.

FIELD OF THE INVENTION

The invention relates to high radiance Ultraviolet (UV) sources of illumination coupled to projection systems for selectively exposing photocurable materials in applications such as maskless lithography and two and three dimensional digital printing.

BACKGROUND

High brightness light emitting diode (LED) light sources have only recently become available at performance levels suitable for challenging high intensity applications in UV curing. There has been a significant increase in the use and value of UV cured materials in the manufacturing process due to significantly higher production throughput afforded by the extremely fast curing of materials in comparison to curing by other conventional means including heat, non-photoinitiated chemical interactions of adhesives, evaporation of volatiles, and the like. This improvement in process time has significant value to the manufacturing community. Imaged UV curing in the case of maskless lithography saves considerable cost in eliminating the need to produce the mask, in addition to the time savings. In the case of three dimensional (3-D) printing, faster cure times result in faster build times which when combined with new high performance curable UV resins enables true 3-D digital printing for manufacturing, an area of technology which is growing quickly.

Conventional UV curing devices typically utilize short arc mercury lamps, xenon lamps, lasers and more recently, systems incorporating pre-packaged high brightness LEDs. Conventional arc lamps suffer from significant arc flicker resulting in the need to homogenize the light which in typical non-Etendue preserving designs reduces radiance (optical power per unit area per unit solid angle [$W/cm^2/sr$]). Arc lamps also suffer from poor lifetime and rapidly decreasing output as a function of time with lifetimes in the hundreds to low thousands of hours at best. This results in added system cost and maintenance expense relative to LED sources which are more stable in output in both the short and long term, and characterized by lifetimes of tens of thousands of hours given proper attention to thermal design. In the last several years laser diodes have been used to replace arc lamps, however, laser diodes are extremely expensive compared to both arc lamps and LEDs, and suffer from image artifacts due to the high temporal and spatial coherence relative to LEDs. Conventional implementations using LEDs, however, suffer from relatively low radiance and lifetime due to limitations of their optical, mechanical and thermal designs.

Prepackaged LEDs are defined as devices comprising an LED die or die array sitting on top of one or more thermally and electrically conductive materials. The thermal impedances of these multiple interfaces leads to a cumulative total thermal impedance that results in high LED junction temperature, thereby degrading LED output and life. Examples of prepackaged UV LED devices include those offered by the SemiLeds® and Nichia® product lines.

SUMMARY

A UV LED digital micromirror device (DMD) illuminator according to embodiments of the invention uses a three way telecentric optical imaging system, telecentric in object and image space as well as at the aperture stop, to enhance the intensity imaged from the LED array through the tapered non-imaging collection optic, through a keystone corrected and tilted hollow light integrator, with integral parallelogram shaped field stop and a telecentric stop which reimages light that falls outside the dimensions of the aperture stop, and is sized to match the 12 degree half angle of typical DMD devices. The combination of the reclaimed light that would otherwise be lost at the aperture stop together with the optimal imaging to just overfill the DMD's active area results in optimal efficiency, reduced thermal load on the illuminator housing and on the DMD device and reduced stray light for optimal image contrast in comparison with other commercially available UV DMD illumination systems.

Illuminators, according to embodiments of the invention, provide a highly reliable and high power density source of uniform illumination for use in a variety of applications including maskless lithography, selective curing of printed inks and 3-D printing.

Embodiments of the invention described herein include a high radiance UV LED illuminator that projects onto a DMD as a source of high radiance UV energy to be subsequently imaged by a well corrected projection lens with minimal distortion onto an illumination plane with a high degree of spatial uniformity and high intensity. Applications include acting as the illumination portion of a system designed for maskless lithography and 3-D printing and other related UV cured materials applications or as a part of a system providing structured fluorescence excitation.

In one aspect, a hollow light integrator includes a hollow body and an optical field stop. The hollow body has an input aperture at a first end, an output aperture at a second end opposite to the first end and a plurality of inside walls extending along an axis from the input aperture to the output aperture. Each of the inside walls includes a reflective surface. The first end includes an input face that is normal to the axis and the second end includes an output face that is tilted with respect to the axis. The optical field stop is shaped as a parallelogram.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein.

DETAILED DESCRIPTION

The present invention relates to LED illumination used for the photopolymerization of materials with controlled spatial structure, i.e., imaged UV energy, afforded by imaging the output of a high power UV LED array onto the aperture of a DMD and subsequently through a projection lens and onto a desired surface of illumination.

Embodiments of the present invention include an LED based illumination source for improved intensity and spatial uniformity at the illumination plane resulting in higher cured product throughput which in turn decreases the cost of manufacturing processes relative to prior art. The present invention is distinguished from conventional illumination sources in that it comprises a high radiance profile with high spatial uniformity which optimizes system performance and results in much improved lifetime due to minimizing thermal impedance between the bottom sides of the LED die and associated heat sinking elements. Further enhancement of intensity results from reclaiming a considerable fraction of the optical power that would otherwise be lost at the aperture stop of the imaging system and redirecting it onto the DMD device. Additional system level improvements of the invention result from decreasing the optical power on the DMD outside its active area, thereby decreasing thermal load and increasing lifetime of the DMD element itself and decreased stray light, thereby improving image contrast.

Figure 1:
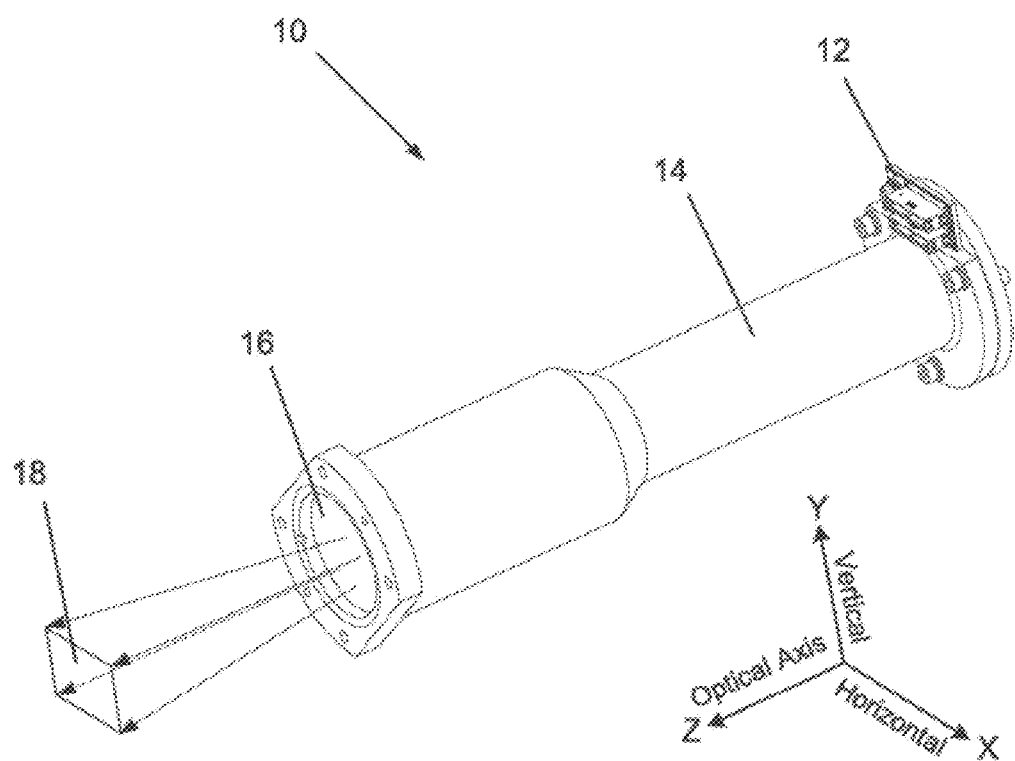
FIG. 1 is a diagrammatic isometric view of a preferred embodiment of a high radiance UV LED illuminator comprising LED Board, heat exchanger, and lens assembly. The relative position and size of the illumination image are shown.

Referring now to FIG. 1, there is shown a diagrammatic, isometric view of the outside of a preferred embodiment of the UV LED DMD illumination source designated generally as system 10. The UV LED illumination source system 10 comprises an LED assembly 12, a lens housing 14, and a lens system of which the most distal lens element 16 is shown. The illumination device projects an image 18 along the Z-axis which is positioned coincident with a DMD device with similar aperture extents and comprising telecentric illumination at each position on the DMD within a 12° half angle of acceptance. The long axis of the rectangular DMD aperture is oriented along the horizontal X-axis and the short axis of the aperture in the vertical Y-axis. Typically, the size of the illuminated image from the system 10 overfills the DMD slightly, for example by 5% to 10% to account for system positional tolerances.

Figure 2:
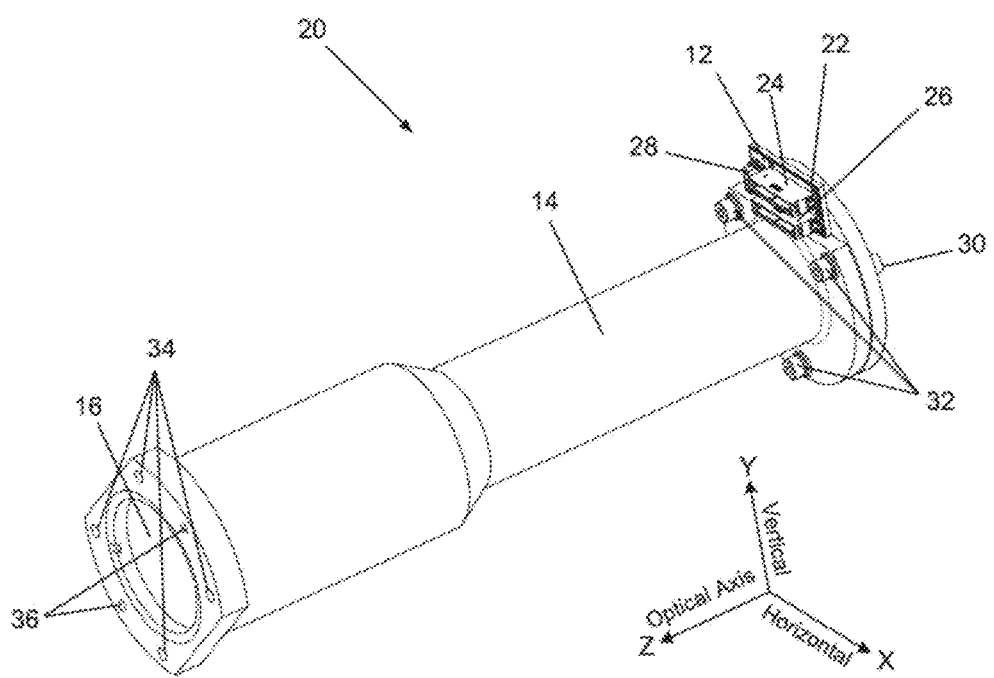
FIG. 2 is a diagrammatic isometric view of the system of FIG. 1 indicating additional detail.

Referring now to FIG. 2, there is shown a diagrammatic isometric view 20 of the illumination source 10 of FIG. 1 showing additional structure of the illumination assembly. LED board assembly 12 is sandwiched between the flange of the lens housing 14 and the water heat exchanger assembly 30 by three bolts 32 positioned symmetrically about the flange at 120 degree intervals to apply uniform pressure of the back side of the LED board 22 and the water heat exchanger 30. A thin uniform layer of high thermal conductivity material such as silver conductive grease, aluminum oxide thermal grease, phase change thermal gap filling material, solder, diamond thermal paste, etc. is deposited between the back side of copper LED board 22 and heat exchanger face of heat exchanger 30 to optimally couple heat between the devices. In a preferred embodiment silver filled thermal grease is used. One eight-pin high current connector 24 is used for the common anode connection. An additional eight-pin connector 26 is used for the cathode; however, it is divided into four pins per 2 channels to allow for use of 2 different spectral bins of UV LED die. This can readily be extended up to the total number of LED die in the array, if desired. There is also a photosensor and thermistor attached to the LED board which is connected by a smaller, low current connector 28. The front flange, surrounding distal lens 16, has a pair of kinematic interface features 36 comprising a hole and a slot to assure that the illumination system can be accurately and repeatedly attached to the mating DMD assembly (not shown) by four bolts going through four holes 34 on the distal flange of the lens housing 14.

Figure 3:
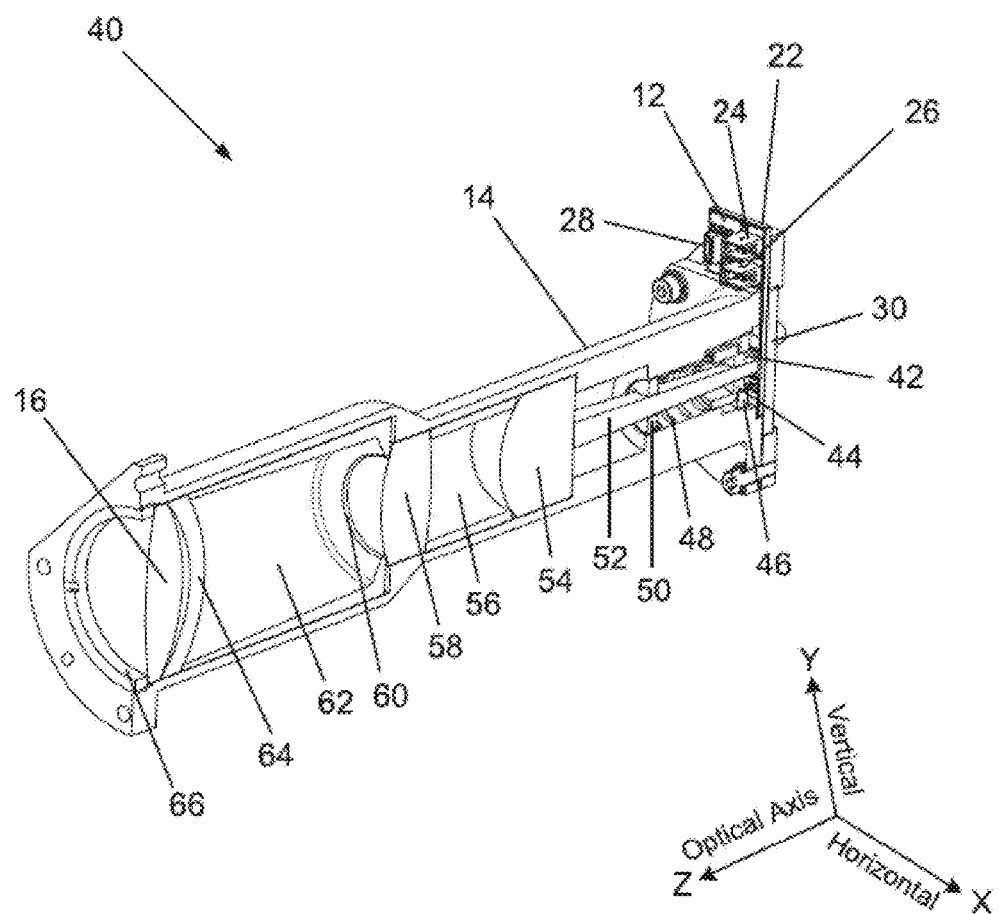
FIG. 3 is a diagrammatic cross sectional view of the system of FIG. 1 showing internal optical and mechanical components as well as the LED array interfaced to the non-imaging collection optic.

Referring now to FIG. 3, there is shown a diagrammatic cross section of an isometric view of the system 20 of FIG. 2. With reference from right to left, the water heat exchanger 30 can have microchannel features to allow water to flow with optimal exchange of heat between the copper material it is made of and the water flowing between the heat exchanger inlet and outlet at a given flow rate. The back of the LED board 12 comprising a sheet of copper 22 is thermal interfaced to the heat exchanger 30 with silver filled thermal paste. The LED die array 42 is shown interfacing proximally to a tapered straight sided non-imaging collection optic 52 within its rectangular aperture, the details of which will be made clear below. The collection optic 52, commonly referred to as a taper, is centered and held in position relative to LED array 42 by holders 44 and 50 with spring 48 pushing the taper up against first lens element 54. A spacer 56 positions second lens element 58 up against the lens systems aperture stop 60 which also functions as a spacer for third lens element 64. Lens element 64 makes direct contact near its outer edge with distal lens element 16, thereby requiring no spacer. A lens retainer 66 holds the four lens elements and two spacers securely up against the seat in the housing 14 of lens 54. This resists the spring 48 from pushing the lens 54 toward the output of the lens systems and assures that the taper 52 is reliably positioned in distance by the order of 100 to 200 microns from the LED array 42. A shim is used between LED board assembly 12 and the proximal flange of lens housing 14 to set the distance between the LED array 42 and input to the taper collection optic 52 to account for manufacturing tolerances.

The glass elements 52, 54, 58, 64, and 16 in a preferred embodiment are made out of a low UV absorption glass type such as fused silica, but can be made of other low dispersion UV transparent glass materials such as BK7 or B270, crystalline materials, salts, diamond, sapphire or UV transparent silicone or sol gels. Optimally, the materials are anti-reflection coated to minimize Fresnel reflective losses and to minimize ghosting at the illumination plane. The housing 14 is made of black anodized aluminum in a preferred embodiment due to its low mass, high thermal conductivity and reasonably low thermal expansion coefficient and low cost. High flux UV energy can degrade standard black anodization so more robust coatings, such as Optic Black™ manufactured by Pioneer Metal Finishing of Green Bay, Wis., are preferably used. Standard anodization will turn color and result in deposits onto the lens elements which can result in loss of optical power. Additionally, the difference in thermal expansion coefficients between the optic materials and the housing and spacers are selected to minimize temperature dependent changes in focus.

Figure 4A:
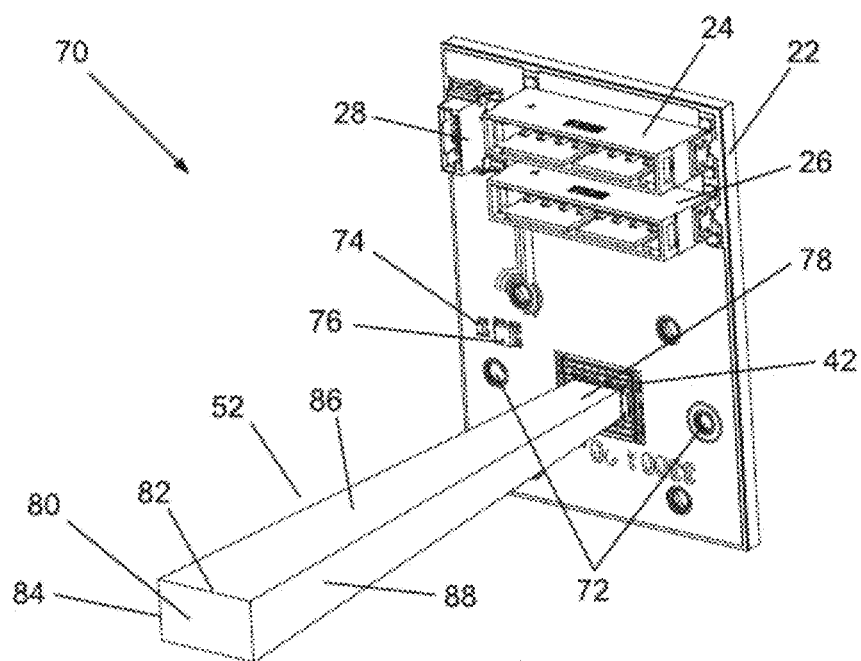
FIGS. 4A and 4B show, respectively, a diagrammatic isometric view and a cross sectional view of the LED board and collection optic of the system of FIG. 1.

Referring now to FIG. 4A, there is shown a diagrammatic isometric view 70 of the LED board assembly 12 of FIG. 3 as interfaced to collection optic 52. FIG. 4A affords a better view of anode connector 24 and cathode connector 26 as well as photosensor and thermistor connector 28. The thermistor 74 and photosensor 76 are shown to the upper left of the LED array 42. The thermistor allows a control system to continually monitor temperature in the event that the cooling system is turned off or fails. Such a control system quickly shuts off the LED die array in the event of a sudden spike in temperature to avoid catastrophic failure. An additional use of the thermistor is to enable a temperature sensitive correction of the output by calibrating output of the LED array as a function of current and temperature. For example, if the ambient temperature were to increase then the temperature dependent output of the LED array would decrease. A closed loop system can be controlled by an analog or digital control loop to adjust the output current to maintain constant LED output power.

This approach of monitoring output with a thermistor, however, does not account for long term decreases in LED output with time. Therefore, a photosensor 76, which is comprised of a UV sensitive detector, such as a silicon photodiode coupled to a transimpedance amplifier, is able to monitor changes in output and drive the current higher through a closed loop control to maintain constant output power over both time and temperature. The bottom cavity of the housing 14 has features that allow a small amount of the UV energy emitted by the LED array to be sampled. Alternatively, a separate photosensor off the LED board can be used to look transverse to the Z-axis in the middle of the collection optic 52 to sample the amount of UV energy transmitted by the system. Silicon photosensors are very stable with time and the applicable temperature range and thus make an accurate measurement of optical power.

The taper 52 is comprised of a rectangular input side 78 mating within less than 500 microns of the LED array 42 and with an aspect ratio similar to that of the DMD, although strictly speaking the aspect ratio of the output aperture 80 comprising long side 82 and small side 84 is what is imaged onto and determines the size of the DMD illumination. If the aspect ratio in the two orthogonal directions of the input and output apertures are not the same then the far field is not symmetric, but assuming the aperture stop of the illumination system is circular, the resulting far field is circular so it is not a requirement that the aspect ratios of input and output of the taper be the same. Thus, the aspect ratio of output face 80 of tapered collection optic 52 is preferably substantially similar to that of the DMD micromirror array positioned at illumination plane 18 of FIG. 1. The sides of the taper are substantially flat with larger face 86 and smaller face 88 symmetric on two opposite sides. The purpose of the taper is to capture the UV energy emitted by LED array 42 which extends over a hemisphere in angle space ($2\pi$ steradians) and convert it into a smaller angle $\theta$ with respect to the optical Z-axis that is equal to or greater than the 12° half angle required at the input of the lens system of FIG. 3 to assure that the lens system aperture stop 60 of FIG. 3 is fully filled, otherwise the output would be reduced. As will be described in greater detail below, the output of the taper in a preferred embodiment overfills the aperture stop 60 by an amount that blocks approximately 22% of the power incident on it. Additionally, since the DMD micromirrors are dithered along one plane, it is possible to limit the angular acceptance of rays in the mirror plane to the required 12° half angle, but increase the angle in the orthogonal axis to effectively increase the average numerical aperture of the system and thereby further increase intensity on the illumination plane. This approach requires the projection lens system to have an equivalently shaped elliptical (or rectangular) aperture stop to pass all the power exiting the DMD.

Also indicated in FIG. 4A are a pair of opposed holes 72 through the LED board copper substrate 22 which are interfaced to two kinematic pins, one round, one oval to allow the position of the taper input aperture 78 to be accurately and reliably positioned relative to the LED array 42. These two holes 72 act as the datum feature to which the LED die array is aligned.

Figure 4B:
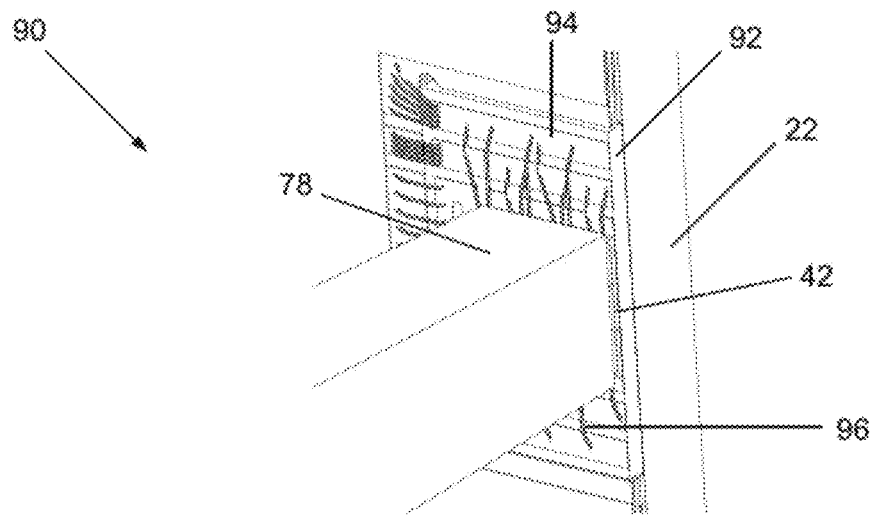

With reference now to FIG. 4B, a diagrammatic cross sectional view 90 of a close up of the area near the LED array of FIG. 4A is shown. A synthetic polycrystalline diamond heat spreader 92 is attached to LED board copper substrate 22 by use a high thermal conductivity solder. The LED die array 42 is attached to gold plated traces on the top of the diamond heat spreader by use of a similar high thermal conductivity substantially void free solder. The LED die can be operated at a current up to the order of 5 Amperes per square centimeter at a voltage on the order of 5 Volts. That results in a heat flux on the order of 2,000 W/cm2. The transverse thermal conductivity of diamond heat spreaders is on the order of 2000 W/m-K, which is roughly five times that of bulk copper. Diamond heat spreaders are anisotropic so the thermal conductivity in the thin dimension (into the heat spreader Z-Axis) is less but still on the order of 600 W/m-K, which is still better than bulk copper. Thus, the heat spreader acts to spread the heat out in the X-Y plane and thereby reduces the heat flux into the copper substrate 22, which further spreads the heat before entering the water heat exchanger 30, of FIG. 4A. The diamond heat spreader 22 has gold traces 94 to which wire bonds 96 are attached from the top of the LED die and in turn those traces are attached by a series of wire bonds to the copper traces on top of the COB.

Figure 5A:
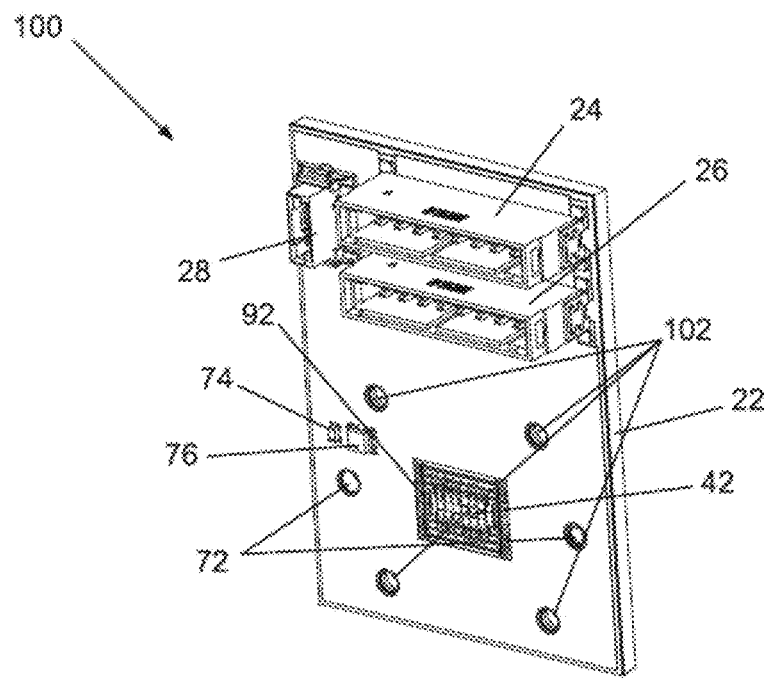
FIGS. 5A and 5B show, respectively, a diagrammatic isometric view of the system of FIG. 4 with the collection optic removed and a close up of the LED array and heat spreader.
Figure 5B:
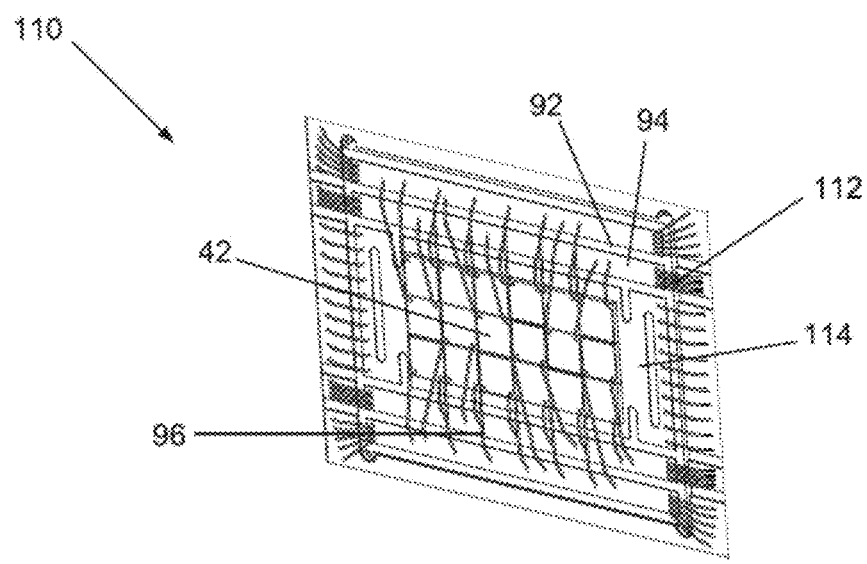

Reference is now made to FIG. 5A which shows a diagrammatic isometric view of the system of FIG. 4A with the tapered collection optic 52 removed. The additional features on the board shown in this view comprise four symmetrically opposed holes 102 which allow the LED board to be attached to the housing 14 prior to attachment of the water heat exchanger 30 of FIG. 2. FIG. 5B shows a diagrammatic isometric close up view of the LED die array 42 and heat spreader 92. There are three rows of six each UV LED die closely packed together to form an eighteen die array for use with a 1080 p 0.95 in. diagonal Texas Instruments® DMD device. Another embodiment of the system uses the same lens system, housing and LED board but is designed for the 1024 by 768 by 0.70 in. diagonal Texas Instruments® DMD device and is comprised of a proportionally smaller taper and a three by four die array of UV LEDs. The typical LED die is approximately 1,000 microns square by about 100 microns in thickness with two each wire bond pads per die. There are two sets of wire bond traces on top and bottom of the central trace where the LED die are attached on the diamond substrate 92. The two sets allow for two different LED wavelength bins to be used to provide a broader spectrum. This is useful for some types of photoinitiators that may change their absorption spectrum throughout the photopolymerization process. Some photopolymers are known to have surface cure inhibition by oxygen preventing good surface curing. The use of UV energy on the order of 250 nm to 280 nm has been shown to prevent this. Such a system can be accommodated with the approach detailed above making use of the recently released 280 nm LED die that are now commercially available. It will be obvious to those of skill in the art that the number of different spectral bins can be extended up to the number of individual LED die if desired with appropriate features on the diamond heat spreader and LED board.

The diamond heat spreader 92 of FIG. 5B is expensive so it is important for overall cost and performance to determine how large the heat spreader should be. As the size of the heat spreader increases, it has less incremental benefit. The relative size of the LED array shown in the preferred embodiment of FIG. 5B is the order of 3.3 mm by 6.6 mm and the size of the diamond heat spreader is 8.0 mm by 10.0 mm which was found to be an optimal tradeoff between heat spreader size, reduction in ΔT between the back side of the LED board and the LED junction temperature and cost, resulting in a temperature drop on the order of 20° C. to 25° C. relative to room temperature of 25° C. This significant drop in temperature allows the LED die to be continuously operated at current densities on the order of 5 Amperes per centimeter squared and since they are at a lower temperature for a given intensity, they last longer. The lifetime of LED die is known to decrease exponentially with increasing junction temperature due to temperature dependent diffusion processes within the diode junction. Computational Fluid Dynamics (CFD) software packages such as SolidWorks® Flow® can be used to run simulations to determine optimal heat spreader size. Alternatively, the data can be determined empirically.

The LED die array shown in FIG. 5B is attached on the bottom side in a common anode configuration to allow the die to be butted together thereby maximizing the radiance. One down side of common anode is that if all the cathodes are tied together to the same current source then differences in forward voltage between LED die can lead to differences in current through each die. This in turn leads to differences in temperature dependent aging. Common anode prevents the LED die from being wired in series to assure that each die gets the same current. In another embodiment of the invention, each LED die is wire bonded to an independent current source. In this way, it is possible to get the thermal and tight packing advantages as well as precise control of each LED die. Additionally, such a current driving scheme is better than series connection since the failure of one LED die does not affect the other die as in a series connection. A further advantage of driving each LED die is that the forward voltage of each can be monitored with time and the system can go through a calibration at start up to monitor the output of each LED die with time to predict lifetime and inform the operator of any future maintenance that may be required.

Figure 6A:
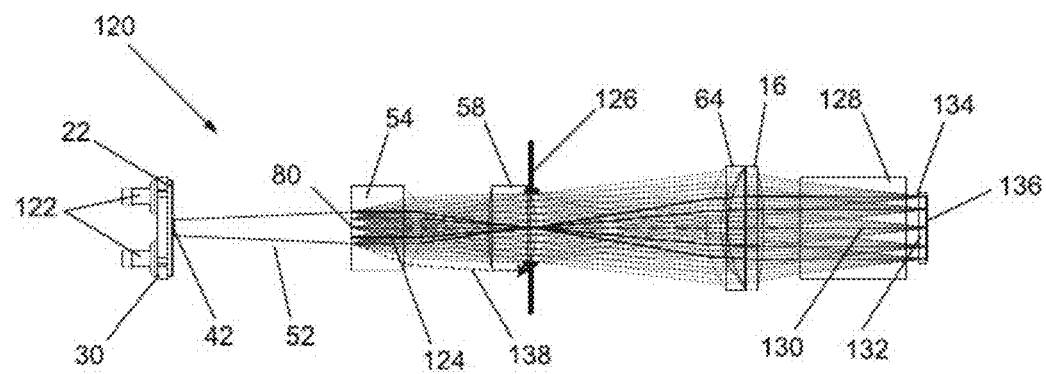
FIGS. 6A and 6B show, respectively, a top view and side view of the optical system of FIG. 3 indicating the rays as transmitted out of the collection optic aperture and onto the DMD illumination plane.

With reference now to FIG. 6A, a diagrammatic top view 120 of the system of FIG. 1 is shown with the housing, spacers, and taper holder components removed for clarity. Lines 124 emanating from the output aperture 80 of tapered collection optic 52 and lines 130 converging from lens 16, respectively, are shown to indicate the optical ray paths as imaged between the taper output aperture and the DMD micromirror surface 136. Rays exiting from a given point on the output of the taper surface 80 converge toward a point of rays 134 on the DMD with the chief ray normal to the DMD surface in a telecentric condition as required for proper use of the DMD. A block of glass 128 is shown positioned between the last lens element 16 of the illumination system and the glass cover plate 132 of the DMD to represent the optical effect (unfolded path) of a total internally reflecting (TIR) coupling prism. This type of prism is often used to couple the illumination into the DMD at an angle of incidence on the order of 24°. For systems that do not incorporate a TIR prism and therefore have a greater angle of incidence on the DMD, there can be a more significant keystone effect due to entering and or exiting the DMD at a larger angle relative to the normal to its surface. Such a TIR prism is used in a preferred embodiment of a 0.95 in. diagonal UV illuminator shown here, however, it will be recognized by those of skill in the art, that the invention could be used without a TIR prism. The optical design is optimized with a piece of glass representing the prism to take proper account of and correct for the aberrations, however, the prism is not included as part of the illumination housing. Rays emitted from aperture 80 but outside the angle space of the lens systems aperture stop 126 are absorbed by the stop and are prevented from transmitting toward the DMD 136. The system of lenses 54, 58, 64, and 16 are designed to be telecentric in both object (taper output aperture) and image (DMD micromirror plane) space. On the object side, telecentricity approximates the virtual far field of the taper, which is also a function of taper length.

In the case where no TIR prism is used to couple the UV energy to the DMD, it is possible to correct for increased keystone by adding a rectangular cross section hollow end piece as an extension to the taper. This hollow end piece directly butts the taper on the proximal side and has a tilted plane in the opposite direction of the tilt of the DMD relative to the optical Z-Axis of the illumination system of FIG. 1. This method of imaging a tilted plane can be used to compensate and substantially correct for increased keystone resulting from direct imaging onto the DMD without a TIR prism. It is critical that the short hollow internally reflective walled device be used at the end of the taper instead of just tilting the output face of the taper, since doing so results in refraction and therefore steering of the chief rays.

The taper 52 of FIG. 6A is designed with a far field distribution which overfills the aperture stop 126 of the UV illumination lens system to increase radiance. This is accomplished by trading off efficiency by recognizing that rays at smaller emitted angles from the LED surface have less power as emitted from a Lambertian source due to the decrease in projected area with increasing angle, which is the well know cosine θ effect. Therefore, by increasing the size and thereby, the Etendue of the LED array 42 and purposely rejecting high angular extent rays emitted by the LED array 42 as they are absorbed by the optical stop 126 of the lens system, the radiance on the DMD 136 can be increased from what it would be limited to by a purely Etendue conserving design. This system can, however, work with a smaller taper and LED array designed to conserve Etendue and achieve high spatial uniformity, but at a lower radiance since the fewer LED die that are required for Etendue conserving designs are proportionally smaller and therefore operate at higher current density and lower efficiency relative to driving a larger array. This concept of trading off efficiency for increased radiance is highly beneficial. The water heat exchanger 30 has input and output ports (reversible) 122 that are attachable to a water to air heat exchanger by use of tubing clamped to hose barbs on 122.

Figure 6B:
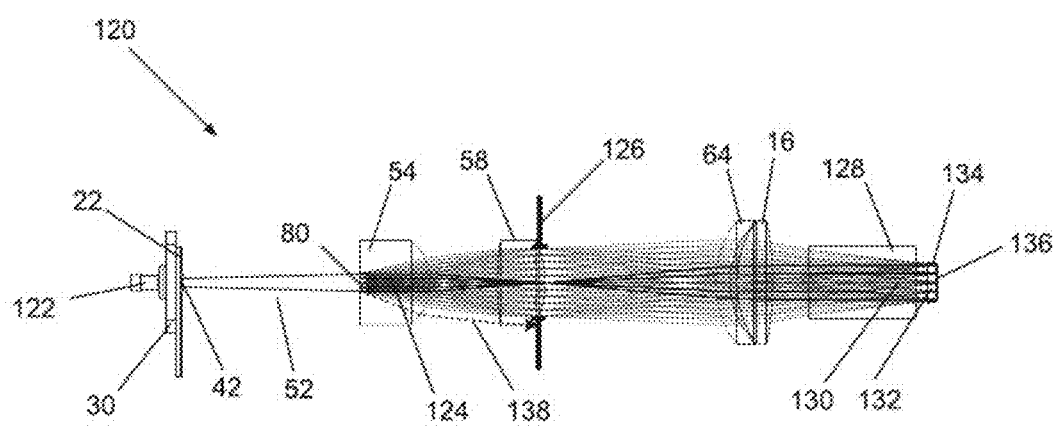

FIG. 6B shows a diagrammatic side view 120 of the system of FIG. 6A representing the narrow output dimension of the taper 52 and DMD 136. Likewise, collectively rays 138 that are emitted at angles larger than the aperture stop 126 are absorbed by it and prevented from transmitting to the DMD. It should be noted that in both FIGS. 6A and 6B, only those rays that pass through the aperture stop 126 are shown. Rays at higher angles that are emitted by the taper 52 and overfill the aperture stop 126 are not shown.

Figure 7A:
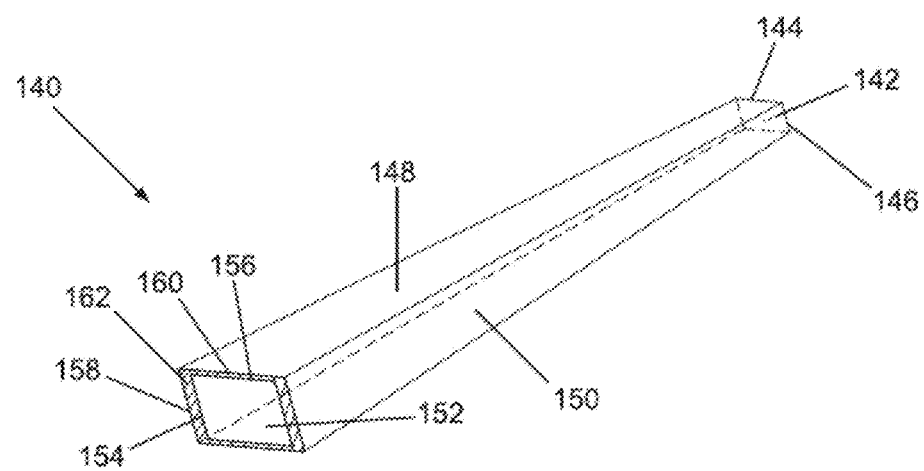
FIGS. 7A, 7B and 7C show, respectively, a diagrammatic isometric view of an alternative embodiment of the collection optic of FIG. 3 with reflective aperture, and top and side views showing how rays pass through the output aperture and reflect off the internal mirrored aperture of the collection optic and back through the exit aperture.

With reference now to FIG. 7A, an alternative embodiment 140 of a tapered collection optic is show in diagrammatic isometric view. The input aperture 142 has long side 144 and short side 146 with a substantially rectangular aperture. Short side 150 and long side 148 are shown corresponding to short output edge 158 and long output edge 160, respectively. As was the case for the taper described above, all six sides of the taper are polished to reduce or minimize surface scattering and are generally made of glass such as fused silica, UV grade low fluorescence Schott BK7 or B270 glass or equivalent. UV rays reflect multiple times as they progress down the taper by total internal reflection. This is a much more efficient reflection means in comparison to reflective hollow tapers, which suffer significant cumulative reflective losses, particularly in the UV where it is more difficult to achieve a high reflectivity coating. The input aperture dimensions of the taper 140 are identical to that of taper 52 as they are both designed to interface to the same LED array 42; however, the output dimensions are proportionally larger. The output dimensions for taper 140 are chosen such that the angular extent of the taper output matches that required to fill the aperture stop of the system of FIGS. 1, 2, 3, and 6. This contrasts to the taper 52 which was specifically designed to overfill the lens aperture stop and take advantage of the cosine θ effect as described above for trading off efficiency for intensity. By changing to the configuration of taper system 140 with a matched far field and by recovering the UV energy that reflects back down the taper off of a high reflectance mirror coating 162, the UV energy that is otherwise absorbed by the aperture stop 126 is partially recovered.

Figure 7B:
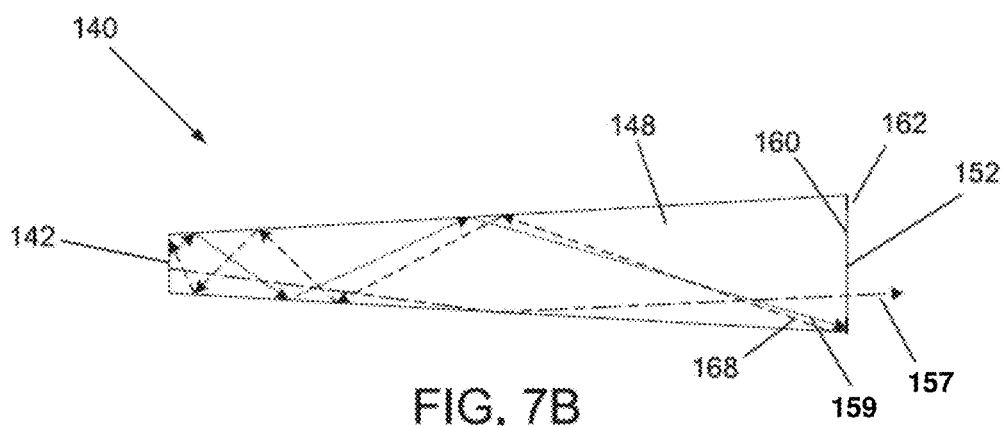

FIG. 7B shows a diagrammatic top view of the taper 140 of FIG. 7A. Ray 159 emitted by the LED array and passing through input aperture 142 reflects off the sides of the taper 140 by total internal reflection and impinges on internally mirrored surface 162 as indicated by ray 168. When ray 168 strikes the LED array, it is diffusely scattered back toward the taper with most of the energy passing back out of aperture 152 and is thereby recovered and can result in an increase by 15% or more in the intensity at the illumination plane. Most of the rays 157 like those recovered rays just described pass directly out of the aperture 152. It will be clear to those of skill in the art that further increases in intensity can be achieved by increasing the LED array size, input and output apertures of the taper, but maintaining the same exit aperture size 152. There are diminishing returns; however, as the increased heat load from the array can reduce the output per LED thereby decreasing the benefit. In addition, the larger the area of the mirrored surface 162 relative to the exit aperture 152, the lower the efficiency due to finite reflective losses of the mirror and LED surfaces as well as losses out the gap between the input aperture 142 of the taper and the LED array 42.

Figure 7C:
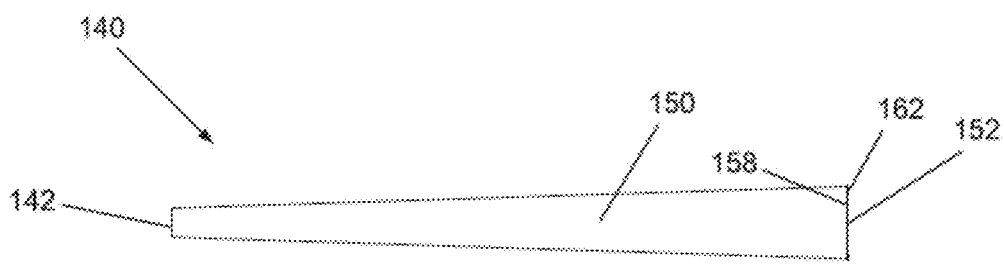

FIG. 7C shows a diagrammatic side view of the narrow dimension of taper 140 of FIG. 7A. The same effect is true for this view for rays striking the mirror surface 162 and returning down the length of the taper, reflecting off the LED array and exiting out of aperture 152. Some of the light that is reflected back off the LED array will be incident on the mirror 162 again. The more times this happens, the more loss occurs for such rays, which again is why there are diminishing returns as the mirrored area size approaches that of the emitting aperture area.

Other shapes that can be used for the non-imaging collection optic include compound parabolic concentrators (CPCs). The system is characterized by the requirement to have high near field uniformity at the output of the collection optic. Non-imaging straight walled collection optics with an even number of sides are excellent at producing very high near field uniformity at their output. CPCs work well as concentrators (or collectors in reverse), however; a CPC only results in uniform near field output at its exit aperture if the input aperture is uniformly filled. That precludes the use of more than one spectral bin of LED die as can be accommodated by embodiments described above. Furthermore, unless a mold process is used, glass CPCs are more difficult to make than tapers which can be conventionally polished. It is possible to substitute a rectangular four-sided CPC in this system for the taper assuming only a single wavelength bin was used, however, even with a single wavelength bin LED die array, the uniformity achieved with a taper is generally better than that achieved with a CPC of an equivalent length.

Figure 8A:
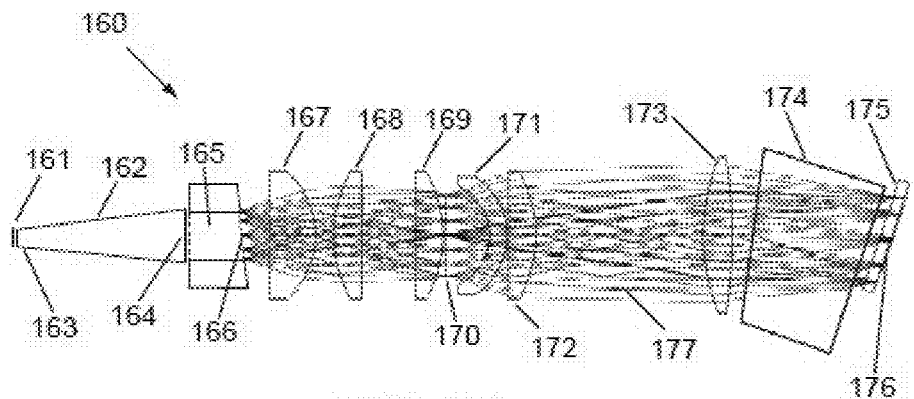
FIG. 8A is a diagrammatic view of another embodiment of a high radiance UV LED illuminator.

FIG. 8A is a diagrammatic, cross sectional view of another embodiment of the UV LED DMD illumination source system designated generally as system 160. The UV LED illumination source system 160 comprises an LED array 161, a tapered non-imaging collection optic 162 with input face 163 and output face 164, a hollow reflective light integrator 165 with tilted output face 166 to correct for image keystone on the DMD, a lens system comprising lens elements 167, 168, 169, 171, 172 and 173 and imaging rays 177 that is telecentric in both object and image space as well as at the aperture stop 170, a total internal reflection (TIR) prism element 174 that represents a thick window with non-parallel input and output faces and a DMD element with window 175 and active area 176.

Another embodiment uses a TIR prism pair, represented in FIG. 8A as a single component 174, and results in the chief ray of the illumination system incident on the DMD surface 176 at an angle of 24 degrees. This allows the reflected beam off the tilted micro-mirrors of the DMD 176 to exit with the chief rays for any image point to be normal to the DMD active area 176, thereby resulting in the least image distortion of the image resulting from the projection lens. The result of the illumination being imaged onto the DMD at 24 degrees angle of incidence for the chief rays is that the illumination image is distorted. If this distortion is not corrected, the object size must be increased to compensate for this image blur in order to achieve highly uniform intensity on the DMD active area 176. The optical power that strikes the DMD outside its active area is partially absorbed by the DMD resulting in increased heating of the DMD and therefore reduced temperature-dependent lifetime. Additionally, the optical power that is outside the active area of the DMD that is not absorbed results in scattered optical power that reduces the image contrast resulting in compromised overall system performance. The illumination image is slightly oversized to address finite system alignment tolerances, but the smaller the overfill area the better.

Figure 8B:
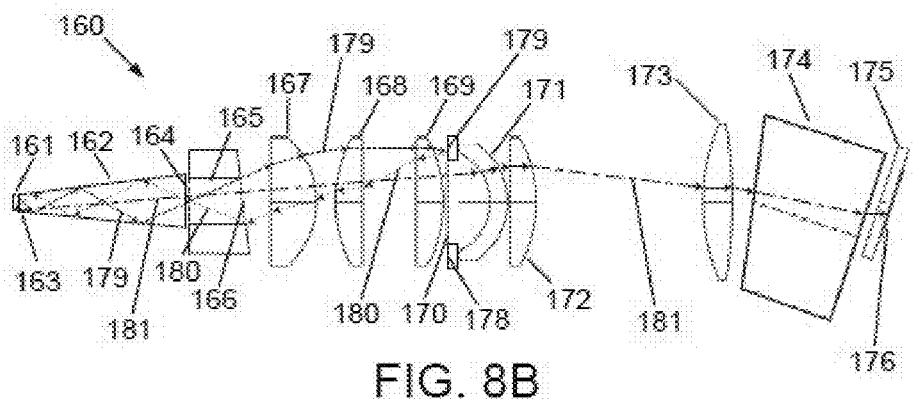
FIG. 8B is a diagrammatic isometric view of the system of FIG. 8A indicating a ray that is emitted from the LED array.

FIG. 8B is a diagrammatic, cross sectional view of the system of FIG. 8A without the imaged rays 177 shown. A reflective aperture stop 178 is shown with its first surface in the plane of and centered on the system aperture stop 170. The optical system is configured such that the rays which are outside the dimensions of the aperture stop 170, that is, outside the transmissive central region, are reflected from the surrounding reflective region back towards their source. Further, the lenses 167, 168 and 169 are configured such that reflections outside the aperture stop 170 are reflected off annular mirror 178 and imaged back into the output aperture at the output face 166 of the hollow light integrator 165. This reflected light is subsequently reflected by TIR off the walls of the tapered non-imaging collection optic 162 and then incident on the LED array 161. This constrains the lenses between the output face of the hollow light integrator 165 and the reflective aperture stop to comprise one half of a symmetric one to one imaging lens system, otherwise the rays do not substantially image back to the hollow light integrator aperture and would be absorbed.

The diffuse reflectivity of UV LED die ranges from the order of 50% to 70%, so that at least a portion of the UV light that reaches the LED die that was returned from the reflective aperture stop has an opportunity to propagate back through the tapered non-imaging collection optic and aperture stop, and to be directed to the DMD active area. This effect is indicated by ray 179 leaving the LED die array 161, traveling through the non-imaging tapered collection optic 162, out of the hollow light integrator 165 through lenses 167, 168 and 169, reflecting off reflective aperture stop 178, at which time the ray is referred to as ray 180, returning back through the hollow light integrator 165 and tapered collection optic 162 to the LED die where the ray is diffusely scattered and returns as ray 181 through the aperture stop 178 and onto the active are of the DMD 176.

One benefit from this reflective telecentric re-imaging aperture stop and lens system is the ability to reclaim optical power that otherwise is stopped by the aperture stop thereby increasing intensity on the DMD active area 176 by the order of 10% or more. Thus, overall system efficiency is improved. This additional intensity can be used to realize faster cure times or used to achieve the same intensity at lower electrical currents and therefore lower LED array junction temperatures, increase LED life, or both. A further benefit is that if the aperture stop is not reflective, the absorbed optical power would increase the heat load and possibly require a cooling system to remove the heat, thereby increasing system cost and complexity.

Figure 8C:
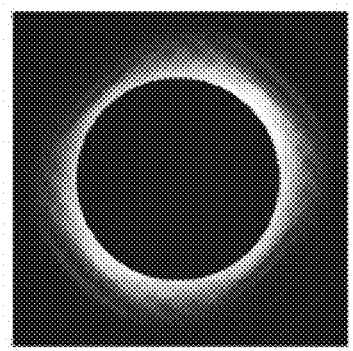
FIG. 8C is an image of the intensity profile of the light that images outside of the optical system's apertures stop that is incident on the mirrored portion of the aperture stop.

FIG. 8C is an image showing the intensity that is incident outside the optical aperture stop of the system 160 of FIGS. 8A and 8B. This optical power outside the aperture stop is the result of using the non-imaging collection optic 162 for which there is some light resulting outside the far field angle of the aperture stop due to its finite length. For an infinitely long tapered collection optic, the amount of light outside the aperture stop is minimal, however, for finite and practical length tapered collection optics, this higher angle far field light results. The system of FIGS. 8A and 8B reclaims this optical power.

Figure 9A:
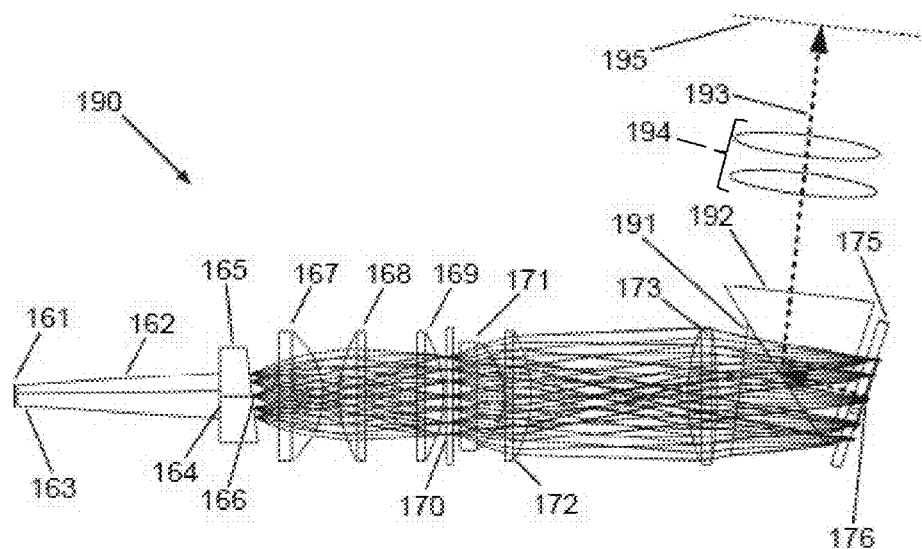
FIGS. 9A and 9B show, respectively, a system comprising a diagrammatic view of the system of FIG. 8A with the total internal reflection (TIR) element replaced by actual TIR elements and a diagrammatic isometric view detail of the tapered collection optic and hollow light integrator of FIG. 9A.

FIG. 9A is a diagrammatic cross-sectional view of a system 190 similar to the system 160 of FIGS. 8A and 8B, but with the taper rotated by 45 degrees to properly image onto the DMD surface 176 since the DMD needs to be oriented at 45 degrees in the plane of the mirror tilt axis. Additionally, TIR prism elements 191 and 192 replace component 174 of FIGS. 8A and 8B to better represent how the light totally internally reflects off of the transverse face of element 192 toward the projection lens 194. Optical energy reflected from the DMD returns to the surface at the interface of TIR prism elements 191 and 192 and is reflected upward in the figure through projection lens elements 194 to form an image at an image plane 195. The chief ray normal to and reflected off the DMD, total internal reflected off the transverse face of element 192 and passing through projection lens elements 194 is represented by ray 193 which is imaged from the DMD to projection image plane 195. The tilt of the hollow light integrator 165 reduces the image blur that occurs due to the light being incident on the DMD 176 at an angle of 24 degrees. In a preferred embodiment this angle is 6 degrees relative to the normal to the optical axis or, stated another way, relative to the angle of the output face of the tapered collection optic 162. The output face is in contact with the input face of the hollow light integrator 165. The hollow light integrator 165 addresses new applications for the DMD illumination system including 3-D digital printing with UV curable materials. For applications such as maskless lithography the illumination system is scanned over the printed circuit board such that each point on the circuit board is illuminated by all pixels along the scan direction. 3-D digital printing applications, however, are not typically scanned, thus each point in the image is only illuminated by a given pixel on the DMD. Thus, if there are any imperfections on the optical components near the object plane such as dust, coating or glass imperfections, typically on the output face of the tapered collection optic and perhaps a window or lens in contact or near contact to the output face of the tapered collection optic, those imperfections can result in image artifacts. As a result, curing for some portions of the illumination area may be compromised. Using the hollow light integrator 165 with inside reflective walls, the object plane (i.e., the output face 166) that is imaged onto the DMD plane is in air and within the closed illumination system such that no imperfections related to dust or coating defects are present at the object plane. The same situation occurs for other fixed illumination plane applications, including microscopy, for which a hollow light integrator is similarly used. Hollow light integrators are typically used for lower performance optical configurations that do not use the more optimal tapered glass non-imaging collection optics. Such configurations inherently do not have the issues with defects at the object surface that can occur for higher performance configurations employing tapered non-imaging collection optics.

Figure 9B:
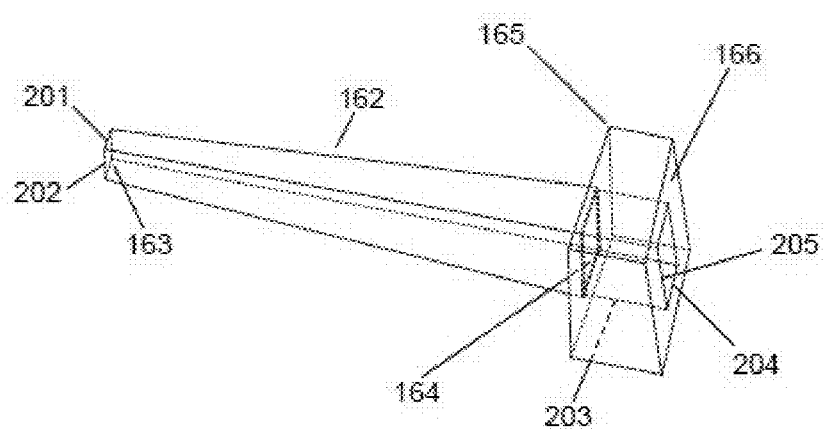

FIG. 9B is a diagrammatic isometric view of the tapered non-imaging collection optic 162 and the hollow light integrator 165. The optical power density incident on and passing through the optical systems 160 and 190 of FIGS. 8A, 8B and 9A is high so materials such as fused silica that do not solarize with extended exposure to high flux UVA light are used. Standard high performance glasses such as N-BK7 have sufficiently low absorption initially, but the absorption band shifts to longer wavelengths due to exposure to UVA light making them unsuitable as such glasses may overheat by UV light absorption and compromise intensity. The tapered collection optic 162 has a ratio of a short input side 201 to a longer input side 202 that generally corresponds approximately to a ratio of the short and long sides of the DMD active area. Some deviation from this ratio is allowed to accommodate realistic LED die array sizes. The output face of the taper 162 is coincident with and slightly larger than the hollow aperture of the hollow light integrator 165. The long side 205 and the short side 204 of the hollow aperture correspond to the object size to properly image onto and slightly overfill the active area of the DMD, typically by the order of five percent. The overfill accommodates finite mechanical tolerances to ensure high uniformity of intensity over the entire active area of the DMD which is subsequently imaged by the projection lens elements 194 onto the curing plane 195. The length 203 of the hollow light integrator 165 is sufficiently large to ensure that any imperfections on the taper output face are sufficiently blurred by the time they reach the output face 166 which is the object plane that is imaged onto the DMD. In a preferred embodiment the length 203 of the hollow light integrator 165 is the order of 10 mm, driven primarily by mechanical holding requirements. The length 203 of the hollow light integrator 165 is generally limited to minimize overall system length and to decrease losses due to the finite reflectivity of the inside walls. In a preferred embodiment the reflectivity of the inside walls is greater than ninety-six percent.

Figure 10A:
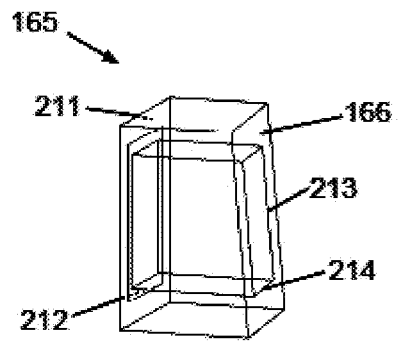
FIGS. 10A, 10B, 10C and 10D show, respectively, a diagrammatic isometric view of the light tunnel of FIG. 9A, a side view showing the tilted object plane, a top view indicating a reflective rim which would be coincident with the tapered collection optic of FIG. 9B, and a top view of the output side.
Figure 10B:
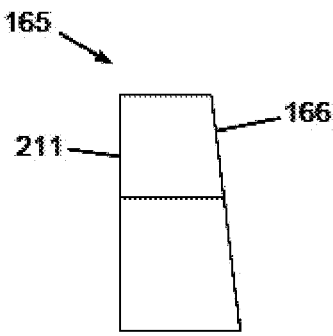
Figure 10C:
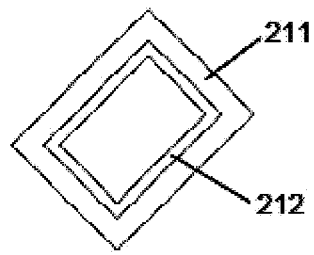
Figure 10D:
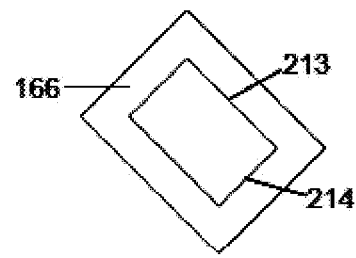

FIG. 10A is a diagrammatic isometric view of the hollow light integrator 165 of FIGS. 8A, 8B, 9A and 9B. The hollow light integrator 165 can be made from four pieces of fused silica glass with reflective coatings on the inside surfaces that are secured together to define a hollow body. An adhesive material such as GE 3145 Silicone RTV that is not degraded by high flux UV exposure can be used. Alternatively, each of the four reflective walls of the hollow body can be made from a reflective mirrored metal sheet. For example, the mirrored metal sheeting can be a 0.020 inch thick Anolux MIRO IV metal sheet (available from Anomet, Inc. of Brampton, Ontario, Canada) having a reflectivity of greater than ninety five percent in the UVA spectrum. There is also a reflective coating 212 which reflects incident UV light over the overlap region where the rectangular output face of the tapered collection optic 162 of FIG. 9B is in contact with the input face 211 of the hollow light integrator 165. The long output face 213 and short output face 214 lie in the plane of the output face 166 which is imaged onto the DMD. The angular tilt between input face 211 and output face 166 for a preferred embodiment is the order of 6 degrees with reference to FIG. 10B. FIGS. 10 C and 10D show the input face 211 with reflective area 212 and the output face 166, respectively.

Figure 10E:
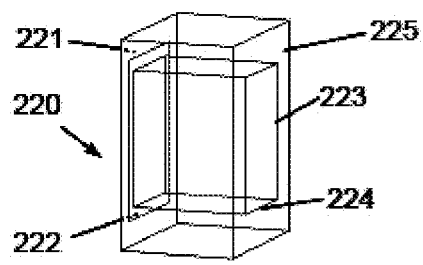
FIGS. 10E, 10F, 10G and 10H show, respectively, a diagrammatic isometric view of the light tunnel similar to that of FIG. 9A but with the output object face plane having no tilt relative to its input face, a side view showing the non-tilted object plane, a top view indicating a reflective rim which would be coincident with the tapered collection optic of FIG. 9B, and a top view of the output side.
Figure 10F:
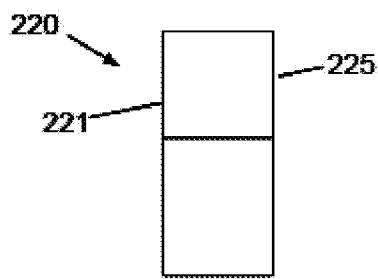
Figure 10G:
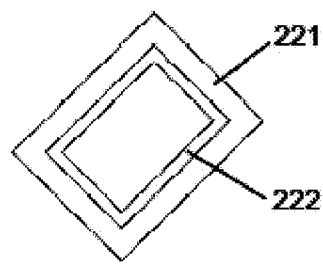
Figure 10H:
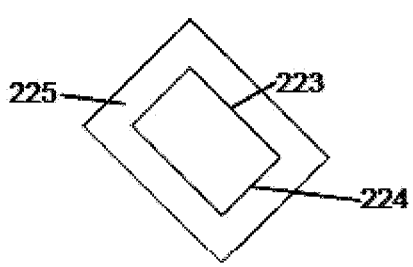

FIG. 10E shows a diagrammatic isometric view of a hollow light integrator 220 similar to the hollow light integrator 165 of FIG. 10A, but with an output face 225 that is parallel to the input face 221. A reflective input aperture 222 acts in a like manner to the reflective area 212 in FIG. 10A. Likewise, the reflective input aperture 222 includes a long side 223 and short side 224 corresponding to the long and short side of the image of this plane on the DMD active area 176 of FIGS. 8A, 8B and 9A. FIG. 10F illustrates how the output face 225 is parallel to the input face 221. The input and output faces 221 and 225 are shown in bottom and top diagrammatic views in FIGS. 10G and 10H, respectively.

Figure 11A:
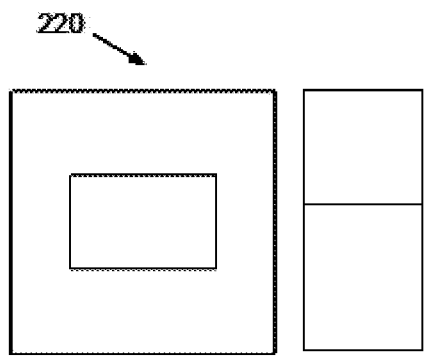
FIGS. 11A, 11C and 11E show, respectively, a diagrammatic output side top views and side view of a hollow light integrator with no tilt and no field stop, a light integrator with tilt and no field stop and a light integrator with tilt and a parallelogram-shaped field stop.
Figure 11B:
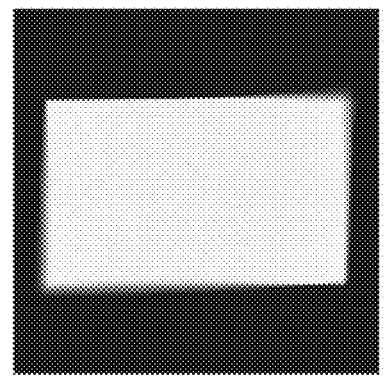
FIGS. 11B, 11D and 11F show the resulting images on the DMD plane for the light integrators of FIGS. 11A, 11C and 11E, respectively.
Figure 11C:
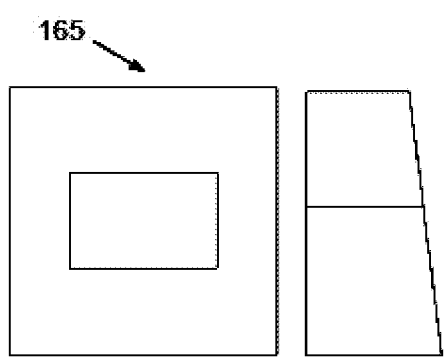
Figure 11D:
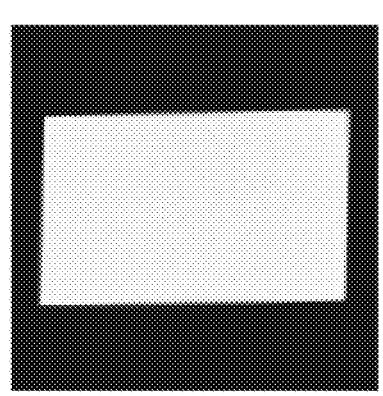
Figure 11E:
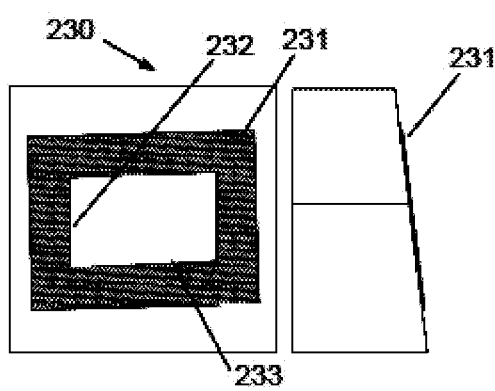
Figure 11F:
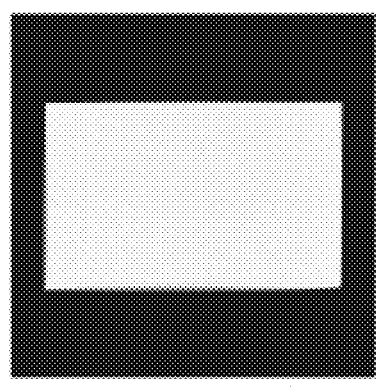

FIG. 11A shows a hollow light integrator 220 in top view and side view and the resulting image on the DMD plane is shown in FIG. 11B. The hollow light integrator 220 is not tilted, that is, the input face and output faces are parallel, therefore the resulting image shown in FIG. 11B exhibits image blur along two opposite corners because the image plane is tilted at 45 degrees relative to the sides of the image according to the tilt plane of the DMD mirrors. This blurred image means that the object size (corresponding to dimensions of sides 223 and 224 of FIG. 10E) has to be increased to assure the full DMD active area is uniform in intensity. In contrast, the tilted face of the hollow light integrator 165 shown in FIG. 11C results in a keystone corrected image as shown in FIG. 11D that is substantially in focus over the entire image. The small image blur in the middle of the long sides of the image is due to field curvature of the illumination lens system, which is one of the tradeoffs made to minimize the number of elements and to keep system cost lower while assuring that telecentricity conditions are met. The image of FIG. 11D is a parallelogram, that is, the left and right smaller sides are vertical; however, the top and bottom sides are not horizontal. This results in optical power outside the active area of the DMD. The optical power outside the active area leads to increased heating and therefore reduced lifetime of the DMD as well as increased stray light resulting in compromised image contrast. Consequently, a partial cure may occur in areas that should be dark, thereby compromising the UV curing system performance. Thus, in a preferred embodiment a field stop 231 is located at the tilted output face of the hollow light integrator 230 shown in FIG. 11E. The non-perpendicular adjacent sides of the parallelogram-shaped field stop 231, with short vertical sides 232 and tilted adjacent sides 233, act to cut off the light producing the parallelogram at the DMD surface, thereby resulting in a sharply focused rectangular illumination area image as shown in FIG. 11F. The field stop 231 optimizes system performance by reducing the thermal load on the DMD, thereby increasing the operational lifetime of the DMD and reduces stray light for improved image contrast.

What is claimed is:

1. A hollow light integrator, comprising:
a hollow body having an input aperture at a first end, an output aperture at a second end opposite to the first end and a plurality of inside walls extending along an axis from the input aperture to the output aperture, each of the inside walls comprising a reflective surface, the first end comprising an input face that is normal to the axis and the second end comprising an output face that is tilted with respect to the axis; and
an optical field stop having a parallelogram shape and being disposed at the output face at the second end.

2. The hollow light integrator of claim 1 wherein the parallelogram shape is oriented with respect to the optical axis to compensate for a keystone distortion of an image formed by an imaging system in optical communication with the hollow light integrator.

3. The hollow light integrator of claim 1 wherein the first end of the hollow body includes a reflective region that surrounds the input aperture.

4. The hollow light integrator of claim 1 wherein the hollow body is formed of a fused silica material.

5. The hollow light integrator of claim 1 further comprising a taper having an output face in contact with the first end of the hollow body and wherein the output face of the taper is larger than the input aperture of the hollow body.

6. The hollow light integrator of claim 5 wherein the first end of the hollow body that is in contact with the output face of the taper has a reflective coating.

7. The hollow light integrator of claim 1 wherein the hollow body comprises four pieces of glass each having a reflective coating on an inner surface of the piece of glass.

8. The hollow light integrator of claim 1 wherein the hollow body comprises four metal sheets each having a reflective mirrored surface.

9. The hollow light integrator of claim 1 wherein the optical field stop has a non-rectangular parallelogram shape.

* * * * *